United States Patent [19]

Lawrence

[11] 4,247,892

[45] Jan. 27, 1981

[54] ARRAYS OF MACHINES SUCH AS COMPUTERS

[76] Inventor: Patrick N. Lawrence, P.O. Box 9212, Austin, Tex. 78766

[21] Appl. No.: 950,569

[22] Filed: Oct. 12, 1978

Related U.S. Application Data

[63] Continuation of Ser. No. 686,944, May 17, 1976, abandoned.

[51] Int. Cl.³ .................... G06F 15/16; G06F 13/00
[52] U.S. Cl. ....................................................... 364/200
[58] Field of Search ... 364/200 MS File, 900 MS File; 365/63; 179/18 GE, 18 GF, 18 AG, 18 EA, 15 AL

[56] References Cited

U.S. PATENT DOCUMENTS

| | | | |
|---|---|---|---|
| 3,106,698 | 10/1963 | Unger | 364/200 |
| 3,231,684 | 1/1966 | Borgstrom et al. | 179/18 EA |
| 3,287,703 | 11/1966 | Slotrick | 364/200 |
| 3,308,436 | 3/1967 | Borck et al. | 364/200 |
| 3,364,472 | 1/1968 | Sloper | 364/200 |
| 3,462,743 | 8/1969 | Milewski | 179/18 |
| 3,544,973 | 12/1970 | Borck et al. | 364/200 |
| 3,579,191 | 5/1971 | Andreae et al. | 364/900 |
| 3,582,899 | 6/1971 | Semmelhaack | 364/200 |
| 3,693,169 | 9/1972 | Kroy et al. | 365/63 |
| 3,705,523 | 12/1972 | Alouisa | 179/18 |
| 3,729,591 | 4/1973 | Gueldenpfennig et al. | 179/18 |
| 3,748,647 | 7/1973 | Ashany | 364/900 |
| 3,815,095 | 6/1974 | Wester | 364/200 |
| 3,842,214 | 10/1974 | Altenburger et al. | 179/18 |
| 3,916,124 | 10/1975 | Joel | 179/18 |

*Primary Examiner*—Mark E. Nusbaum
*Attorney, Agent, or Firm*—Shapiro and Shapiro

[57] ABSTRACT

Improved parallel-processor computer systems and improved data transfer systems incorporating novel networks for inter-machine communication. In a first type of communication system, tree wiring is employed in which the maximum number of outgoing inter-machine communication channels required for any machine of a set of data handling machines to communicate with any other machine of the set is equal to the maximum number of such channels required for communication between a root machine of the set and a machine of the set that is most distant therefrom. Optimum numbers of outgoing inter-machine communication channels for large sets are disclosed. In a second type of communication system, plateau distributed logarithmic wiring is employed. The machines are arranged in multi-dimensional arrays, with each array having sub-arrays and with each machine of each sub-array connected to the other machines of that sub-array and to the corresponding machine of each of the other sub-arrays for each of the dimensional directions. Optimum array side lengths are disclosed.

29 Claims, 30 Drawing Figures

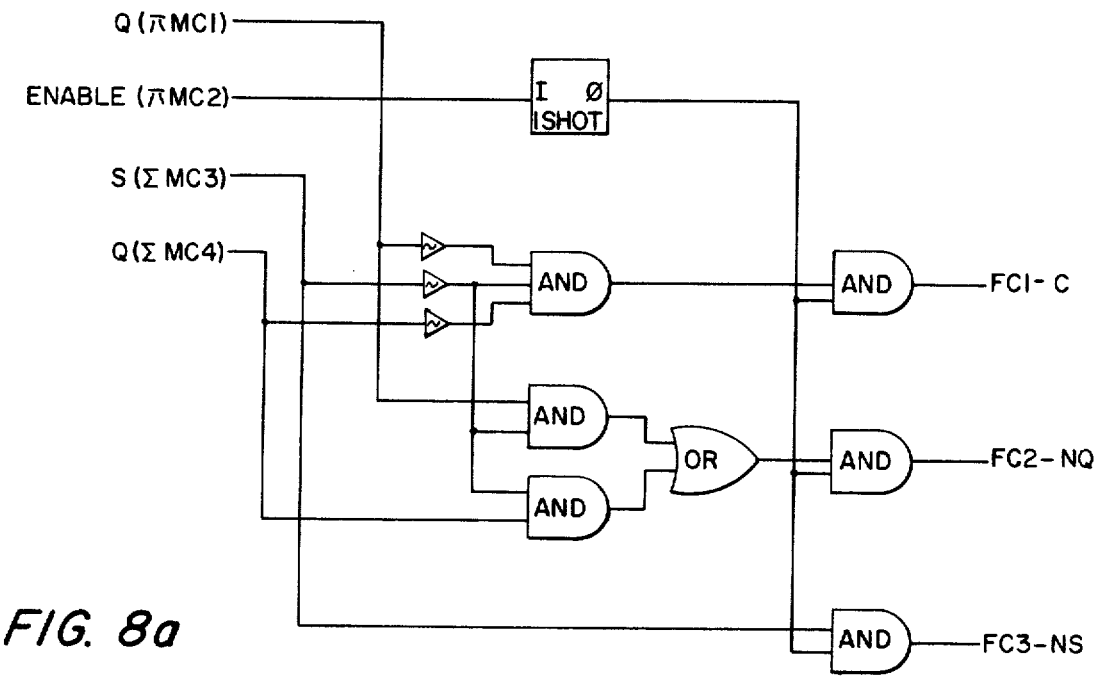
FIG. 8a
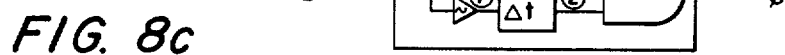
FIG. 8b
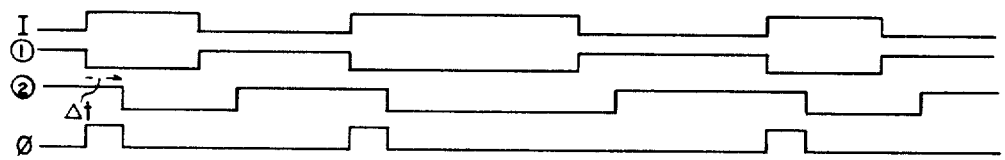
FIG. 8c
FIG. 8d

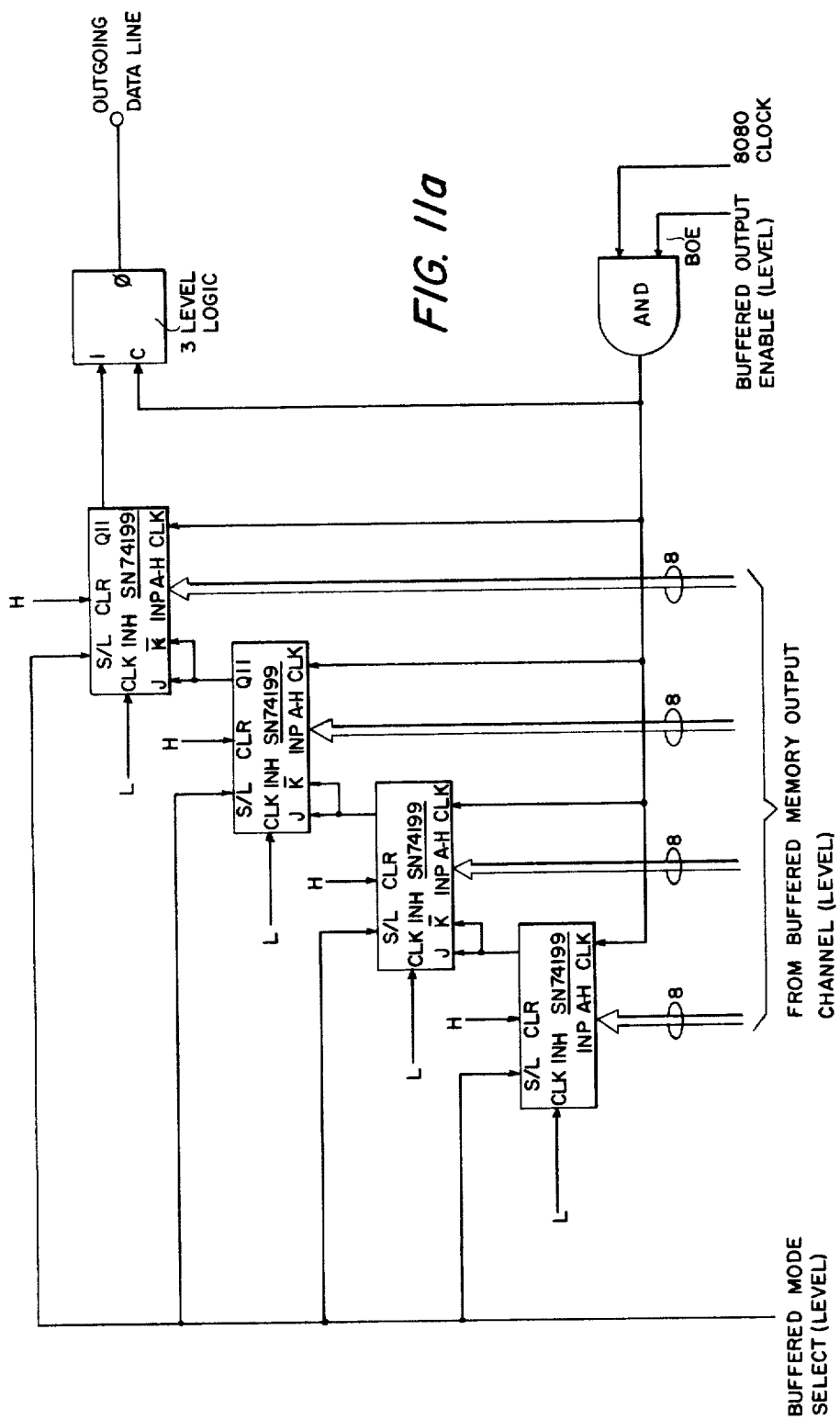

ARRAYS OF MACHINES SUCH AS COMPUTERS

This is a continuation application of Ser. No. 686,944, filed May 17, 1976, now abandoned.

BACKGROUND OF THE INVENTION

This invention is concerned with improvements in arrays of machines such as data processing machines, and more particularly with improved networks for transfer of data between machines. Although the invention will be described with reference to an array of stand-alone computers, it will become apparent that the principles of the invention may be applied to arrays of unit devices other than computers in which there is a need for efficient communication or data transfer between the unit devices. Such unit devices will be termed "machines."

The computing rate of a serial computer is limited by the necessity for all operations to be performed in a serial fashion. It has long been recognized that faster execution of a large class of significant programs can be achieved by parallel processing, that is, execution of various parts of a program at the same time.

Parallel processing can take many forms, but one of the most powerful approaches is to use stand-alone serial machines interconnected in some fashion not only to allow each machine to work on some segment of the problem, but also to enable the various machines to communicate required intermediate results.

The central problem of such a system is the method of intercommunications which is provided. The serial machines can work on their program segments well enough, but it is essential that intercommunications be as efficient as possible. When large numbers of machines must communicate between any two computational segments, the "internal bandwidth" requirement can become very large. This situation develops in any program which attempts to model neural networks, for example, and there are many other examples.

Three basic approaches have been used historically to solve the interconnection problems. The first is a technique which is functionally similar to the operation of the telephone system: one user calls another, a link is established between the two users, and the information is transmitted. Examples of this system are Digital Equipment Corporation's UNIBUS system, and the well-known cross-bar switch. A serious disadvantage of the use of the UNIBUS for interconnecting serial computers is that the process is inherently serial, and all pairs of machines must be enumerated. The cross-bar switch on the other hand requires an amount of hardware which grows with the square of the number of devices to be interconnected, a fact which makes the cross-bar switch a prohibitive technique for even relatively small numbers of devices. Other "telephone system" schemes have similar drawbacks.

The second technique is the "central clearinghouse" approach. Here each machine first deposits a message in a central memory. Then a "master" processor picks up the messages and moves them to an area accessible to the particular receiving machines. To minimize complexity, only the master processor has access to the entire central memory. This process is also serial, since each message must pass through the bottleneck of the master processor. An example of this system exists in the ILLIAC computer. For even moderate internal bandwidth requirements, this system is slow.

The third technique can be likened to the post-office, where each serial machine becomes a postal sorting station and messages (letters) are routed through intermediate stations to destinations. Any system utilizing this scheme to communicate among component processors will be called a Post Office Transfer (POT)-array computer. Perhaps the best known POT-array computer is the ILLIAC IV, which uses the postal-sorting message system as its principal internal communications technique.

Historical practice has been to design POT-array computers by laying out the component serial machines on a two-dimensional array and connecting "nearest neighbor" machines by communications lines. Even this primitive configuration has a measure of the advantage which is potentially available in the POT-array intercommunications technique over the other known intercommunications methods already described. That advantage is that the process of intercommunications is no longer serial, but parallel. Thus the same computing power increase which is available through parallel computation during the execution portion becomes potentially available in the intercommunications portion of a program as well. Historical practice, however, has failed to recognize the full potential of the POT-array computer and to allow maximum parallel advantage to be achieved in the intercommunications portion of a program.

BRIEF DESCRIPTION OF THE INVENTION

It is an object of the present invention to provide improved parallel processors, particularly of the POT-array type.

Another object of the invention is to provide improved communications between machines, such as computers, of an array.

A further object of the invention is to provide improved computer systems.

A still further object of the invention is to provide improved "wiring" systems or networks for interconnecting machines of an array.

Another object of the invention is to provide improved data transfer systems.

Briefly stated, in accordance with one embodiment of the invention, the machines of a POT-array are interconnected by wiring schemes providing greater efficiency in the utilization of wires than has been possible heretofore. Both wiring complexity and transmission time are significantly reduced. Multi-dimensional arrays with optimum numbers of machines in each dimensional direction are employed to provide powerful machine systems with enhanced data transfer between machines.

BRIEF DESCRIPTION OF THE DRAWINGS

The invention will be further described in conjunction with the accompanying drawings, which illustrate preferred and exemplary embodiments, and wherein:

FIG. 7a is a block diagram of a portion of a typical computer system employing novel machine interconnections in accordance with the invention;

FIG. 7b is a system map explanatory of the operation of the structure of FIG. 7a;

FIG. 8a is a block diagram of a foreman computer logic circuit employed in the system of FIG. 7a;

FIG. 8b is a logic map explanatory of the operation of the structure of FIG. 8a;

FIG. 8c is a block diagram of a 1-shot multivibrator employed in FIG. 8a;

FIG. 8d is a timing diagram explanatory of the operation of the structure of FIG. 8c;

FIG. 9a is a block diagram of a computer control logic circuit employed in FIG. 7a;

FIG. 9b is a timing diagram explanatory of the operation of the structure of FIG. 9a;

FIG. 10 is a block diagram of a failure logic circuit employed in FIG. 7a;

FIG. 11a is a block diagram of output channel logic employed in FIG. 7a;

FIG. 11b is a timing diagram explanatory of the operation of the structure of FIG. 11a;

FIG. 12a is a block diagram of input channel logic employed in FIG. 7a;

FIG. 12b is a timing diagram explanatory of the operation of the structure of FIG. 7a;

FIGS. 13 and 14 are block diagram of different forms of transfer hardware architecture which may be employed in FIG. 7a;

DETAILED DESCRIPTION OF THE INVENTION

Although, as stated above, the invention has broad utility to data transfer in arrays of machines, for purposes of illustration the invention will be described in its application of a POT-array computer, a prior art example of which is the two-dimensional ILLIAC computer shown and described in U.S. Pat. No. 3,287,703.

A POT-array computer does not have to be arranged as a two-dimensional array, however.

In wiring a POT-array for inter-machine communication, any wiring scheme may, theoretically, be employed which uses the Post Office data handling concept, by which each machine is connected to some subset of the remaining machines for the transfer of data. The extreme of connecting all machines to all others is uninteresting because the number of wires (interconnections) required in even moderate-sized collections of machines is prohibitive. The smaller this number of wires can be made, the larger can be the number of machines in the collection.

Minimizing the number of wires, however, increases the number of stops a particular message must make, in general, to travel between any two machines. Thus the desirable goals of minimum number of wires and minimum number of stops for a particular message are at cross-purposes. Prior wiring arrangements in which each machine of the array is connected only to its nearest neighbors by uni-directional or bi-directional communication channels are far from optimum.

Two basic wiring schemes have been discovered, in accordance with the invention, to provide a much better balance of the number of wires vs the number of stops. The first scheme referred to hereinafter will be termed "tree" wiring, and two practical cases will be described. The second scheme to be described will be termed "Plateau Distributed Logarithmic" wiring, or simply "PDL" wiring.

It will be assumed that neither wires nor stops are more important, and wires (W) will be traded off against stops (T) on an equal basis, as the product WT. It will further be assumed that all machines have the same number of one-way data lines (wires) or communication channels exiting to other machines, although two-way channels may be used, and there may be advantages in employing asymmetrical wiring schemes in some cases. In general the symmetrical scheme is more powerful. A wire or inter-machine communication channel as referred to herein has a data transmitting source machine at one end and a data receiving machine at the other end, with no "machines" in between the ends, although there may be intermediate ancillary equipment, such as amplifiers.

Figure 1:
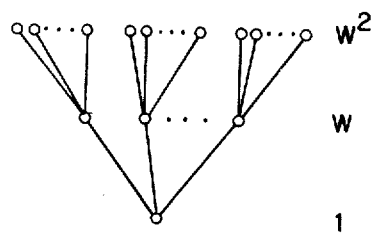
FIG. 1 is a diagram illustrating a novel wiring arrangement for interconnecting machines of an array in accordance with the invention.

The optimum utilization of the wires exists under the following conditions, illustrated in FIG. 1. Select one machine (Row "1"). Let the number of wires exiting from it be W (the number of machines in Row "W"), as for all machines. Then there are W machines reachable in one stop. Similarly, each of those machines can reach W machines in one stop (Row "$W^2$"). Thus the first machine can reach in at most two stops, itself (1), plus W one-stop machines (W), plus W machines for each of W machines ($W^2$), or $$1 + W + W^2.$$

In T stops the first machine can reach $$\sum_{i=0}^{T} W^i = \frac{W^{T+1} - 1}{W - 1}$$

machines. As long as T is large enough to accommodate as many machines as a specific configuration requires, then such a T is a count of the number of stops needed, and this is the smallest T available in any POT-array configuration of W wires per machine.

The difficulty in terms of building one of these configurations lies in the necessity for being able to substitute conceptually any machine in the array for the first machine without changing any existing wires, but only adding wires to the last set of machines, $W^T$ of them. This topological transformation does not appear to be possible in the general case. Even in cases where it is possible, the addressing scheme for locating the next stop for a particular message is very complicated.

Figure 2:
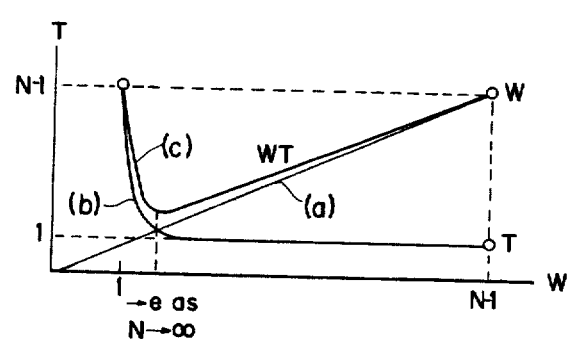
FIG. 2 is a graphical diagram employed in conjunction with the arrangement of FIG. 1.

However, this model is valuable to indicate the lower bound on intercommunications performance to be expected from any POT-array configuration. If WT is computed for a given number of machines, N, it has been discovered, in accordance with the invention, that as N approaches infinity, the minimum value of WT occurs at a value of W which approaches e, the base of the natural logarithms, as shown in FIG. 2. In that figure three curves are shown. Curve (a) is W (ordinate) as a function of W (abscissa). Curve (b) is T (ordinate) as a function of W (abscissa), and Curve (c) is WT (ordinate) as a function of W (abscissa).

Thus in the best possible POT-array wiring scheme, "tree" wiring, only two or three wires exiting each machine are needed to have the optimum trade-off between W and T. This wiring allows a "root" machine to branch W ways to W machines. Each of these machines branches to W machines, and so on. In the final row of machines, each machine branches back into the earlier machines so that every machine has W outgoing and W incoming wires, and the maximum number of steps between any two machines is the same as the number of steps between the root machine and the final row.

Topologically, this pattern cannot be completed in general if the last row is fully populated. In practice, either (1) fewer machines than indicated must be put in the last row, or (2) some machines need to allow more than W wires in or out. In Case (1), where the final row is depopulated, each machine has the same number of outgoing wires and the system is symmetric as to any machine. In Case (2), where the final row is full, wires are added to the final row to maintain the basic requirement of the same maximum number of stops in transferring data from any machine to any other machine.

Figure 3:
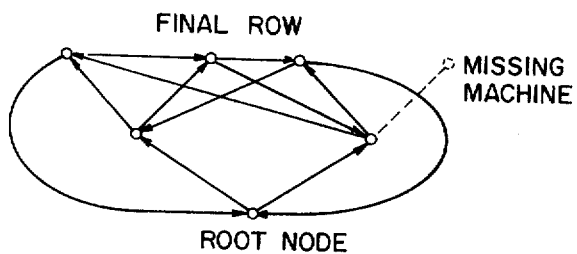
FIGS. 3 and 4 are diagrams of specific cases of the wiring arrangement of FIG. 1.

An example of Case (2) is shown in FIG. 3. Here, W = 2 and the scheme is carried two rows from the root node. The final row is short one machine, for a total of six machines in the array. Although this example is WT-optimum, the algorithms for determining data transmission in the array are not as simple as in the PDL wiring, to be described, and increase in complexity as the number of machines increases.

Figure 4:
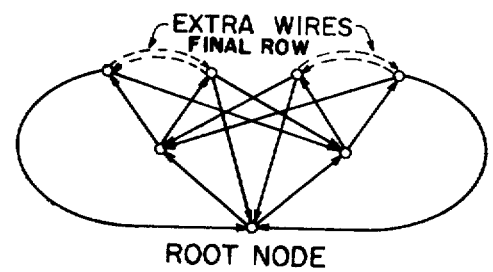

An example of Case (2) is shown in FIG. 4. Here, all the machines of the complete scheme described in the previous paragraph are present, including the four machines in the final row. A total of seven machines are in the array. Extra wires from the last row to the root machine are needed to maintain a two-step maximum transfer distance. In large arrays, the placement of the additional wires is difficult to specify as they are fanned out through the array. In general, many extra wires may need to be handled by selected machines in the array, increasing design and fabrication complexity. Routing problems are also present in this approach.

The following algorithms, though not necessarily optimum, may be used to permit data transfer in tree wiring systems:

Select a machine. Between that machine and any other there exists exactly one path or sequence of intermediate stops. Build a table showing the next stop for all possible destinations from the selected machine. This can be implemented as a RAM-memory system to allow changing the table to reflect changes in the availability of various subsets of the tree which may occur, for example, during failures. The entry into the RAM is the ultimate destination and the result obtained from the RAM in the next stop. Such a RAM is included in each machine. At initial system load, all such RAMs (which may be a part of the local machine's memory system itself) are initialized and remain unchanged as long as the system configuration does not change.

The failure of a single machine isolates a large portion of the machines in the array. If the wires are made bi-directional, a single machine failure isolates only a single machine, provided that the operating system is notified of the failure, recomputes the next-stop table for all of the RAMs and re-distributes the data. Then the same method of communicating, namely inspecting the RAMs, can be used. If ambiguities of path exist, select the first path which is found in an exhaustive search, provided it is of minimal length.

Although the foregoing tree wiring arrangements are superior in terms of the WT product and are practical, further development is needed to make them as easy to use as the PDL wiring scheme which will be described hereinafter.

The tree wiring scheme just described is topologically complex when employed in large multi-dimensional arrays. A simpler, but still highly efficient wiring scheme, PDL wiring, can be employed in accordance with the invention. A POT-array employing this wiring arrangement can be described in simple Euclidean geometrical terms. Consider a cube subdivided completely into cubical compartments. Each compartment contains a serial machine, and the cube is a 3-dimensional array of such machines. A "nearest neighbor" machine is any machine which has a face of its cubicle in common with a chosen machine. If a machine has one or more faces which are in common with no other machine, and that face is made artificially adjacent to the face of the unique other machine which lies at the end of the row of machines which is perpendicular to the open face, and this is done for all such machines in the collection, then the resulting topological configuration is no longer a cube, but a torus. Viewed another way, take a 2-dimensional square array and foll it into a tube by bringing two parallel sides together. Connect the ends of the tube to form a donut, or torus (still a two-dimensional array, topologically). A ring of such toruses with corresponding machines in the toruses interconnected becomes a 3-dimensional array. There is no reason to limit the structures to two or three dimensions. Higher dimensional arrays are very useful, if somewhat more difficult to visualize. The topological name for an N-dimensional cube is a hypercube, and an N-dimensional torus is a hypertorus. In a cube or hypercube, all edges are the same length. There are cases where it is useful for at least one edge to vary from the others in length. The topological name for such a configuration is a hyperrectangular parallelopiped. For simplicity the term hypercube is used to cover this case also, recognizing that a distinction does exist. A torus does not require that all edges be the same length. Hence no special term will be needed. "Hypertorus" covers all cases.

Many previous POT-array computers contain as an essential feature a rectangular or cubical structure, wired as a torus, but previous arrays employ wiring schemes in which each machine is wired only to its nearest neighbor in each dimensional direction. Such wiring schemes are not efficient in terms of WT. In accordance with the preferred PDL wiring scheme of the present invention, each machine is connected to all others in a line extending along each dimensional direction, for bi-directional communication. If the communication channels are uni-directional there will be an outgoing "wire" from each machine to each other machine along each dimensional direction of the array, and if bi-directional channels are used, each pair of outgoing wires interconnecting any two machines for bi-directional communication will be replaced by a single bi-directional wire.

When a mathematical trade-off is made between W, the number of wires exiting any particular machine, and T, the number of stops required for any machine to send a message to any other, it has been surprisingly discovered, in accordance with an important concept of the invention, that the product, WT, has a minimum when the N machines in the hypertoroidal array are connected into an array with five machines on an edge. The actual minimum of the WT product is obtained for edge-length equal to 4.92..., independent of N. This number is the solution to the transcendental equation.

$$x(2 - \ln x) - 2 = 0,$$

where ln is the natural logarithm.

Figure 5:
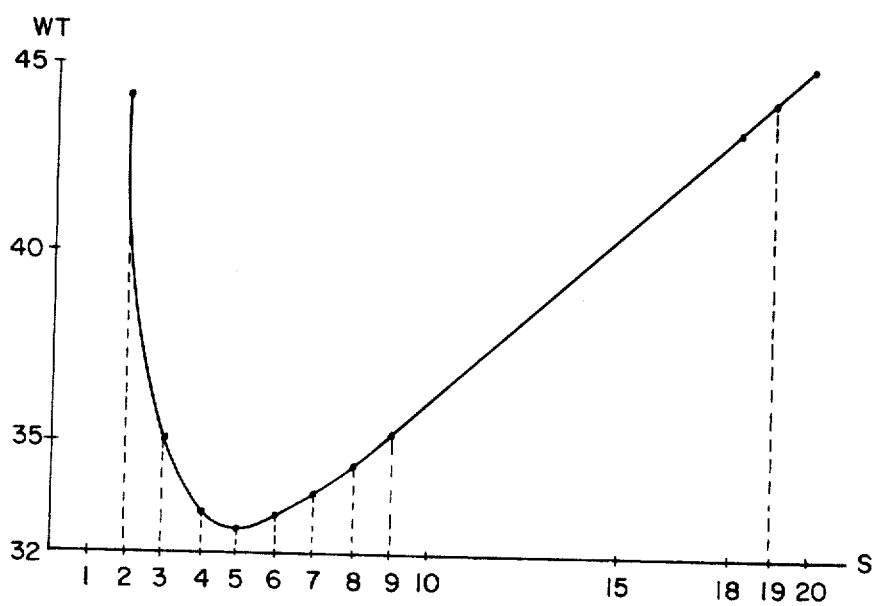
FIG. 5 is a graphical diagram employed in explaining the wiring arrangement of FIGS. 6a–6e.

Obviously, the number of machines on an edge (side) must in practice be an integer. The most nearly optimum sidelength S is shown by the following table and by the graph of FIG. 5 to be five.

| S | WT (N = 100) | WT (N = 10000) | WT (N = 1,000,000) |
|---|---|---|---|
| 4 | 33.1 | 132.4 | 298.0 |
| 5 | 32.7 | 131.0 | 294.7 |
| 6 | 33.0 | 132.1 | 297.3 |
| 7 | 33.6 | 134.4 | 302.4 |
| 8 | 34.3 | 137.3 | 309.0 |
| 9 | 35.1 | 140.6 | 316.3 |
| 18 | 43.2 | 172.6 | 388.4 |
| 19 | 44.0 | 176.1 | 396.3 |
| 20 | 44.9 | 179.6 | 404.1 |

In all these examples $WT = (S-1)D^2 = (S-1)(\log_S N)^2$, where D is the dimensionality of the array.

It does not matter how many machines are included in the collection, for the maximum bandwidth and minimum hardware trade-off the optimum sidelength of the hypercubic or hypertoroidal array is five machines to a side. That is not to say that other sidelengths using PDL wiring are not useful. Larger sidelengths have the advantage of greater bandwidth, but the disadvantage of more complex hardware. While sidelength five represents the best utilization of hardware in the hardware-bandwidth trade-off, larger sidelengths have utility in applications requiring maximum bandwidth. Sidelength four is attractive because the fact that the sidelength is a power of two simplifies the hardware (at the cost of bandwidth) and because it is nearly optimal. Smaller sidelengths represent an inefficient use of hardware and therefore are not encompassed within the invention. In general, PDL wiring with sidelength four and greater falls within the broader scope of the invention, but current hardware technology limits the maximum sidelength to of the order of twenty for a two-dimensional array and of the order of ten for a three-dimensional array, asymptotically approaching five for higher dimensions.

The number of machines, N, the dimensionality of the array, D, and the sidelength, S, are related by $$N^{1/D} = S.$$

In general, not all three variables are integers. Of course, in any system to be built, all three variables must be integers. If all integral values of $N \geq 1$, $D \geq 1$, and $S \geq 1$ are selected, integer hypertoroidal POT-array computers are produced. Of the integer configurations, any configuration for which S equals N is, by definition here, called a linear hypertoroidal POT-array computer. All other integer configurations are called natural hypertoroidal POT-array computers. Further, all integer configurations which have, for a given W, the smallest WT available from any integer $S \geq 1$, (and D is integer), are called perfect hypertoroidal POT-array computers. All integer configurations are exact solutions to the hypertoroidal POT-array computer equations. The perfect configurations are in addition optimum solutions.

The following configurations are members of the perfect configurations:

Each N such that $N = 5^D$, for $D = 1, 2, 3, \ldots$

Figure 6A:
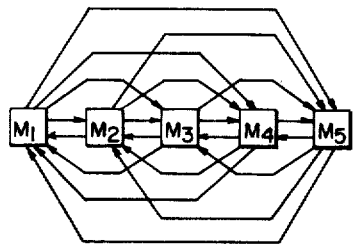
FIGS. 6a–6e are diagrams illustrating arrays of machines interconnected in accordance with another novel wiring arrangement of the invention.

FIGS. 6a–6e illustrate the application of PDL wiring to typical arrays of machines, such as micro-computers. In FIG. 6a, a 1-dimensional array with an optimum sidelength of 5 is illustrated. Each of the micro-computers $M_1$–$M_5$ is shown connected to each other machine along the single dimension by a one-way (uni-directional) communication channel for each of the outgoing connections from each machine. This is the basic PDL wiring scheme, although two-directional channels may be used, halving the number of wires but otherwise increasing communication complexity.

Figure 6B:
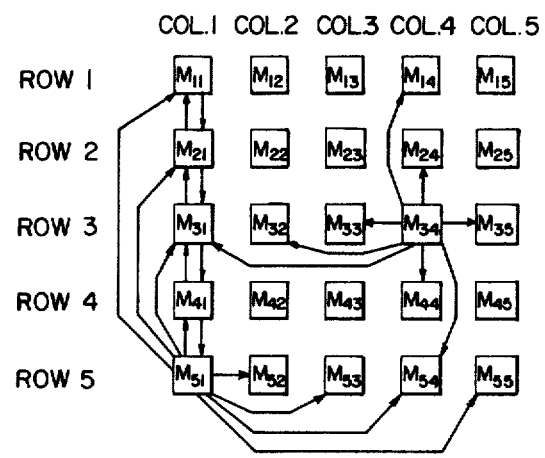

A two-dimensional array with sidelength 5 may be constructed by assembling five of the one-dimensional arrays (rows) of FIG. 6a, to form an array with five sub-arrays (rows) as shown in FIG. 6b. Each machine in each row is connected to the corresponding machine of every other row by an outgoing uni-directional communication channel. For simplicity, only some of the interconnections are shown. The first digit in the subscript of any machine represents the row number and the second digit represents the machine number in that row. The machines in each row are already interconnected as shown in FIG. 6a. In accordance with the PDL wiring scheme, each of the machines in column 1 is connected to each of the other machines in that column in precisely the same manner as the machines of FIG. 6a. The machines of column 2 are interconnected in that manner, and the same is true of each of columns 3, 4, and 5.

Figure 6C:
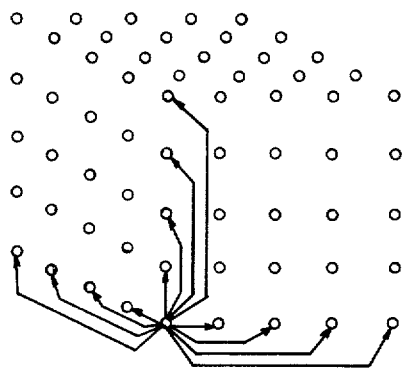

In FIG. 6c, five two-dimensional arrays of FIG. 6b, are assembled to form a three-dimensional array with sidelength 5. The machines in this array are represented by dots forming a cube. Each machine in each two-dimensional array (now a sub-array) is connected to the corresponding machine in every other two-dimensional array by an outgoing uni-directional communication channel, only the wires outgoing from one of the corner machines being shown for simplicity of illustration. The machines in each two-dimensional array are already wired as described with reference to FIG. 6b. The additional connections between corresponding machines in each of these arrays are precisely in accordance with the wiring arrangement of FIG. 6a.

Figure 6D:
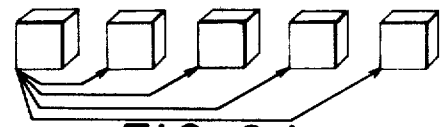
Figure 6E:
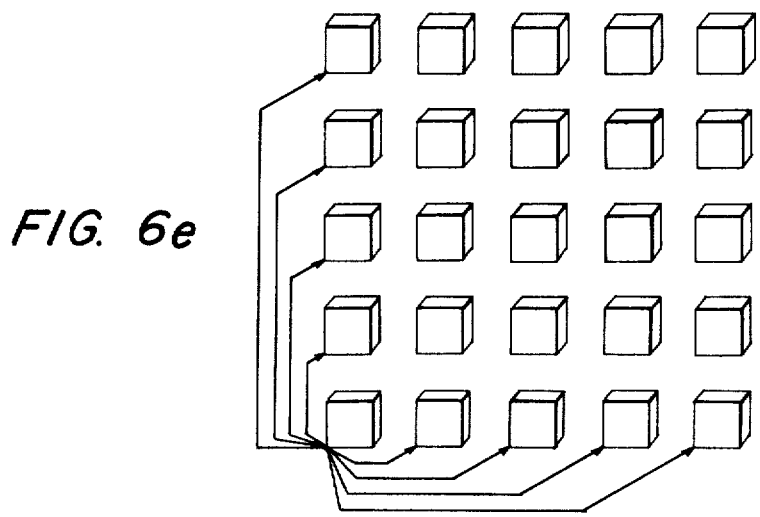

FIG. 6d illustrates how five of the cubes of FIG. 6c may be assembled to form a four-dimensional array with sidelength 5. Each machine of each cube (now a sub-array) is connected by an outgoing uni-directional communication channel with a corresponding machine in each of the other cubical sub-arrays in precisely the same manner that the machines are interconnected in FIG. 6a, only some of the interconnections being illustrated for simplicity FIG. 6e illustrates how five of the four-dimensional arrays of FIG. 6d may be arranged in rows (sub-arrays) to form a five-dimensional array with sidelength 5. Each machine in each row is connected to a corresponding machine in each other row, just as the individual machines in each column are connected in FIG. 6b, again by outgoing unidirectional communication channels. Only some of the interconnections are illustrated, for simplicity. This same scheme may be augmented ad infinitum to form six-dimensional arrays, seven-dimensional arrays, etc. For example, to form a six-dimensional array, the five-dimensional array of FIG. 6e would be replicated in the manner of FIG. 6c, where now the single machines represented by the dots of FIG. 6c are replaced by the cubical arrays of FIG. 6e, with corresponding machines along each dimensional direction interconnected as before.

Now that the basic wiring arrangements of the invention have been described, a practical "best mode" embodiment of a POT-array computer constructed in accordance with the invention will be described—first the general nature and capabilities of the computer and then the details.

All POT-array machines must do two things: (1) compute within each separate machine, and (2) transfer messages among the machines.

Every message which is sent in the POT-array includes a destination and the data to be sent to that destination as components, hence the name "data-destination" or "DD" pair. This name will be used even though other information such as a return address may be included. Each DD pair may comprise, for example, five bits representing the destination, then one parity bit, and finally sixteen data bits.

If the computation and data transfer processes are kept distinct so that the entire POT-array is engaged in exactly one or the other, then the POT-array is said to be synchronous. It is asynchronous otherwise. Synchronous POT-array computers are in most cases conceptually and physically simpler to deal with, while asynchronous systems may hold certain advantages, such as simultaneous computation and data transmission of various distinct portions of the jobs, thus enhancing parallelism and speed.

Two methods of data transfer may be employed—"queue" transfer and "symmetric" transfer. Queue transfer allows DD pairs to be sent by each machine in the order originated or received. It is useful when relatively small amounts of data must be sent within the array. In transfers which require high internal bandwidth (large amounts of interconnectivity), the symmetric transfer is used, because no queues develop anywhere in the array (except of course in each originating machine) and no intermediate storage space is required.

To understand the mechanics of the symmetric transfer, consider a corner machine in a cubic array. Note that due to the hypertoroidal structure really present, any machine in the array could be considered to hold this corner position with no changes in wiring. Starting with the selected corner machine count off the remaining machines in some order, assigning the current count to the current relative position (not machine) as you go. Since any machine could be put in this corner, the position numbering relative to each machine is established. The K-th position relative to one machine is distinct from the K-th position relative to any other machine, all of which are mutually distinct. Thus the set of all K-th relative positions is the same as the set of all positions.

The symmetric transfer in its simplest form enumerates the N-1 K-th relative positions. At each new count, all machines are allowed the opportunity to send messages to the next relative position, if desired. Such messages are transmitted through identical K-th relatives to destination before another new count is created, and the symmetry of the POT-array guarantees that no two data will seek to exit the same machine at the same time (interference), and no data will have to be retained by a machine to let another data pass (queueing). Thus the symmetric transfer as an important process in a hypertoroidal POT-array computer provides high internal bandwidth with no interference and no queues.

The above process assumes that no more than one exit wire is used in the originating machine at each count. If more are used, the process becomes even more efficient and can approach $1/W$ of the time required for the simple case above. Still, no interference or queueing develops as long as the combinations of relatives chosen at each enumeration require that data move initially in the same dimensional directions, change direction at the same time, and that data initially moving in orthogonal directions (different dimensional directions) continue to move orthogonally at all times. Such combinations can be specified, although certain specific enumerations can in some cases necessitate less than full wire utilization at some point.

The symmetric transfer handles large data transmission requirements very well in POT-array structures. It was designed to handle the all-to-all (ATA) transfer, a special case in which each machine sends one message to every other machine. This ATA transfer can be used as a yardstick of comparison to measure the internal bandwidth of array computers. If an array machine can handle the ATA transfer effectively, it can also effectively handle other large internal bandwidth requirements.

As the internal bandwidth requirements become less than the ATA transfer, the utility of the symmetric transfer diminishes to the point where it is more efficient to use the queue transfer. Both transfer techniques are therefore integrated into the hypertoroidal POT-array design as integral components of the functioning of the POT-array during transfer of meassages. The logic to decide which technique to use under what circumstances is also integrated into the system so that although the system user may determine which transfer method to employ, he is not required to do so. The system will automatically select the best transfer method based on information available.

Consider, now, a specific hypertoroidal POT-array system of the invention, first at a high level then in increasing detail. This system is an example of hypertoroidal POT-array architecture but not necessarily the best possible design. Indeed, a unique "best possible" design for a system may not be possible, since it is usually propitious to match a system to its intended use, a process which invariably involves compromises and trade-offs. Given an application or constraint (other than the constraint to be a "general-purpose computer"), a "best possible" design can be specified.

To avoid confusion arising from higher-dimensional structures, consider a cubic array of sidelength five, that is, 125 machines wired into a three-dimensional torus by PDL wiring as in FIG. 6c. Thus each machine has outgoing message lines to four other machines in each of three directions, for a total of twelve "wires" per machine. No message need ever make more than three stops (two intermediate and one final) to reach any machine from any other.

The array will be synchronous, will execute and transfer phases kept distinct by means of control logic operating a "voting system". Assume the array is in the execute phase. To go to the transfer phase, all component machines "vote" by means of a fan-in "AND" gate. When all machines agree to go to transfer phase, the array is put in transfer mode by the control logic. Similarly, the return to execute phase is accomplished by unanimous consent through a fan-in "AND" gate. Certain hardware and/or software protections may be provided to prevent "hanging" the system in one phase or the other. One approach is to segment programs by pre-processing to request timely phase changes. Another approach is to "time-out" in one phase in the control logic and move to the other phase. Other methods exist.

The transfer phase is further synchronously subdivided into "transmit" phases. Each machine in the transfer phase selects and prepares the next messages to be sent. As many messages as there are wires (twelve in this case) may potentially be prepared. Error detection and correction codes, such as the "Hamming" code, may be included in each message and checked at each stop to aid error detection and recovery. Each machine then signals the control logic that it either has no message to send or that its message(s) are ready to go. When all machines have reported in, the control logic signals the array to transmit. Each machine then sends its prepared messages, perhaps receiving up to twelve more messages in the transmit step. Methods such as bit-counting or timing are used within each machine to determine when each has received all the data it will receive. Then each machine begins preparing the next messages to be transmitted. Finally a signal is sent from each machine to the control logic requesting another transmit step, or denying the need for one. When all machines agree that no more messages need to be sent, the control logic puts the array back into the execute phase. This is the basic cycling of the array.

The computer system can thus be visualized as a hypertoroidal POT-array structure with a minimum of combinational control logic attached to the array to control the phases. All other attached hardware can be considered as pheripheral equipment. The peripheral equipment is simply treated as more of the array by the array itself. Another dimension is added, or a side extended to provide the peripheral areas. Thus a machine in the array will have at least one additional outgoing "wire" which goes to the peripheral area. No special treatment of I/O data by the array is required. Messages are shipped just as they would be to other parts of the array.

Peripheral devices are special addresses, however, in the sense that they can talk only with the array and not among themselves. This means that messages to particular peripheral devices must be routed through an associated group of machines. For example, in a two-dimensional array all I/O with the peripheral may be required to pass through a corner machine. If either the peripheral controller machine or the corner machine is down, the peripheral is isolated from the array.

An improvement to the above peripheral scheme can be achieved by allowing peripherals to be hard-wired to current members of the array and to use those machines themselves as controllers. Then the full power of the alternate routing capabilities of the POT-array is available to the peripheral. It is always essential that the machine controlling the peripheral be operational, of course. If it is not, then the peripheral is down and unavailable.

Peripherals could be handled through a cross-bar switch one side of which is attached to some subset (preferrably random) of the array with the other side connected to the peripherals. The control of the cross-bar switch could itself be a peripheral handled like any other, with the exception that it would receive priority treatment. It is overly complicating and inefficient to use this peripheral technique, however, when a principal power and utility of the POT-array architecture is its ability to intercommunicate more effectively than a cross-bar switch. It is preferred instead to use the POT-array directly to handle the peripherals.

The three components, the hypertoroidal POT-array, the combinational control logic, and the peripherals, then, form the hardware of the computing system described above. In addition, certain software is of course employed in the operation of the structure. The programs to execute the queue and symmetric transfers are included in each machine, preferably in permanent form, either hard-wired into the logic, or placed in a Read-Only Memory (ROM). Also employed in the operation of the array is an operating system (OS), several desirable features of which will now be described.

The classical purpose of an OS is to control the use of a computer system. In particular, the OS allocates resources and does bookkeeping. The OS in this computer system must perform two tasks. First, it must manage failures of individual machines within the array, and second it must assign machines and peripherals to jobs in the incoming job stream, and collect statistics on the jobs.

There are several features which may be incorporated in the OS because of the nature of the POT-array which are unique to the POT-array system or which enable more efficient use of the system than otherwise possible.

When one or more component machines fail, as they will from time to time in normal use, it is not nessary to take the entire system out of service, as it is when major components fail in current machines. The failure of one machine represents the loss of only a small fraction of the computing power of the system. Methods for detecting failures are myriad. A method applicable to POT-arrays is the use of all the machined hardwired to a failed machine to detect and announce the failure. Thus a high degree of redundancy greatly increases the likelihood that the failed machine will be detected and reported to the OS. Diagnostics to detect such failures will be run when machines are otherwise unoccupied. Any failure which occurs during execution of a job or any other failure results in a report (through the POT-array) to a peripheral which has the job of collecting such reports and signalling the OS.

The use of such a peripheral is necessary if the OS runs in some subset of the machines in the POT-array, not in its own machine or in a peripheral machine, and the particular subset currently doing the job may change dynamically with time. The OS keeps track of which machine contains the main OS loop and makes certain that the error-collecting peripheral is always properly assigned.

When an error is detected, the OS executes any error-recovery program. A map is maintained in the OS which shows which machines are currently up and which are down. It also shows which of the "up" machines are assigned to which jobs. At the next transfer phase, the OS sends highest-priority messages to all up machines which are currently executing the program in which the failed machine is involved. The OS directs such machines to "flush" their current work and retreat to the immediately preceding check-point in the program from which processing may be recovered and may continue. Such check-points are added to each job as they are prepared for execution against such a failure possibility. This retreat does not necessarily apply to other jobs in the system.

The OS also sends messages to all machines which are hardwired to the failed machine, directing them to remove the failed machine as an available direction along which messages can be sent. The transfer algorithms resident in each component machine make reference to a list of currently available exit directions, and select a "next step" for each message from that list, no more than one message per exit per transmit. Thus it is easy to delete a failed machine as a condidate to receive messages.

Such removal of available transfer directions does diminish the internal bandwidth of the array, but five to ten percent of the component machines must fail before serious degradation begins. This much failure is unlikely in general.

A more serious problem concerns the ability of the OS to get critical messages through a system which does not yet know it contains a failed machine. This is a problem only if the failure involves a failure in the transfer abilities of the offending machine. Even so, the OS sends identical messages in multiple directions to maximize the probability that all messages will get through. As long as a path exists to the desired destination, the POT-array is such that the message will get through.

It should also be observed that after notification of a failure, the OS maintains the current execute phase (by simply continuing to execute in the host component computer) until all recovery messages have been prepared. The next transfer phase then allows all recovery information to be passed.

Finally, the OS deletes the failed machine from the "up" list and adds it to the "down" list, removing it from service. A message is created to tell the outside world of the failure. The job which was running in the failed machine at the time of the failure, in addition to returning to the previous checkpoint, must be reassigned into the array to exclude the failed machine.

Of course, at some degree of failure recovery will be impossible, and the entire system will go down. The percentage of "up" time in this system, however, will far exceed current computers of comparable complexity. Thus the POT-array, due to the distributed computing capability of its hardware structure and essential software, will not only be gracefully degradable to a degree far beyond current machines, but will remain usable a significantly higher percentage of the time.

Consider now a POT-array computer of the invention in which the mainframe consists of a micro-computers (MC's) wired with sidelength five into a PDL POT-array. The maximum dimensionality is five.

Each MC is a stand-alone computer with 8 bytes of random-access memory, INTEL 8080 central processing unit, 256 input device and 256 output device peripheral capabilities, multi-level interrupts, and a 2-microsecond cycle time. This is a standard basic configuration available from INTEL Corporation, 3065 Bowers Avenue, Santa Clara, California 95051. It is chosen simply because it is the fastest, smallest stand-alone computer currently available. Any equivalent or improvement would suffice.

Each element of the mainframe POT-array consists of:

1. The computer just described together with the PDL communications line buffers, both input and output;
2. The logic required to interpret commands received from the Foreman Computer (FC) and to send requests to the FC;
3. Communications line buffers to possible peripherals; and
4. Power supply circuitry. All of these devices reside on exactly one board. (Note that the state-of-the-art allows over 300 18-pin DIP integrated circuits to reside on both sides of one ten-by-twelve inch multi-layer board with up to 300 or more connectors in the board socket; this design requires fewer than 300 DIP's and fewer than 100 connectors per board.) All boards in the mainframe are identical and interchangeable.

The mainframe is layed out as though all 3125 MC's are present, although fewer MC's may be actually installed. The missing MC's are treated as "down MC's" by the Operating System (OS) and the POT-array can function with any number of MC's from one to 3125 physically present so long as no machine is physically isolated from the rest of the array in a less than fully populated system. Execution rates are of course positively correlated with the number of MC's installed and operational. Thus all sockets for MC boards in the POT-array mainframe are symmetric and boards can be installed in any available mainframe socket providing the PDL wiring scheme is logically followed.

Data travels uni-directionally in each communications line. All data channels are one bit wide. Communications lines use three-level logic ($+1, 0, -1$) to allow operation independent of other lines without requiring a companion clock line for each data line.

The POT-array is controlled with combinational logic. Request lines are incoming to this logic from all MC's and various commands are issued under various conditions. A separate MC of the INTEL 8080 variety described is provided as peripheral to the POT-array to act as the FC. Its principal function in this design is to manage a "status flag" buffer, one bit per MC, to allow graceful degradation of the array when an MC fails. When failure of some MC, $MC_i$, is reported through some diagnostics, the FC sets a bit in the status flag buffer. Thus a mechanism for failure recovery is provided for use by the system programmed. It is also possible to do other forms of error detection and recovery with the FC under software control. While the FC handles initial system load (ISL) and recovery procedures, this simple execute code "hands off" to the OS which runs in the array, early in the ISL procedure.

Peripherals, in general, have their own MC as a controller. They communicate with the array through the peripheral communications lines. These lines look like array intercommunications lines, but are not involved with data movement within the array. Peripherals are connected to several different MC's to maximize the probability that at least one MC will be operational to allow data to transfer between the peripheral and the array.

The mainframe organization is based on groups of five MC's as described with reference to FIGS. 6a–6e. The physical organization puts 25 MC boards, the FIG. 6b array, in a horizontal rack. Five such racks comprise a column, logically illustrated by FIG. 6c. Five columns make a line (FIG. 6d) and five lines form a plane (FIG. 6e) which holds 3125 MC's all wired as a fifth dimensional PDL POT-array. During system expansion, each dimension is populated completely in a uniform, linear fashion before additions are made to the next higher dimension.

Figures 7A, 7B:
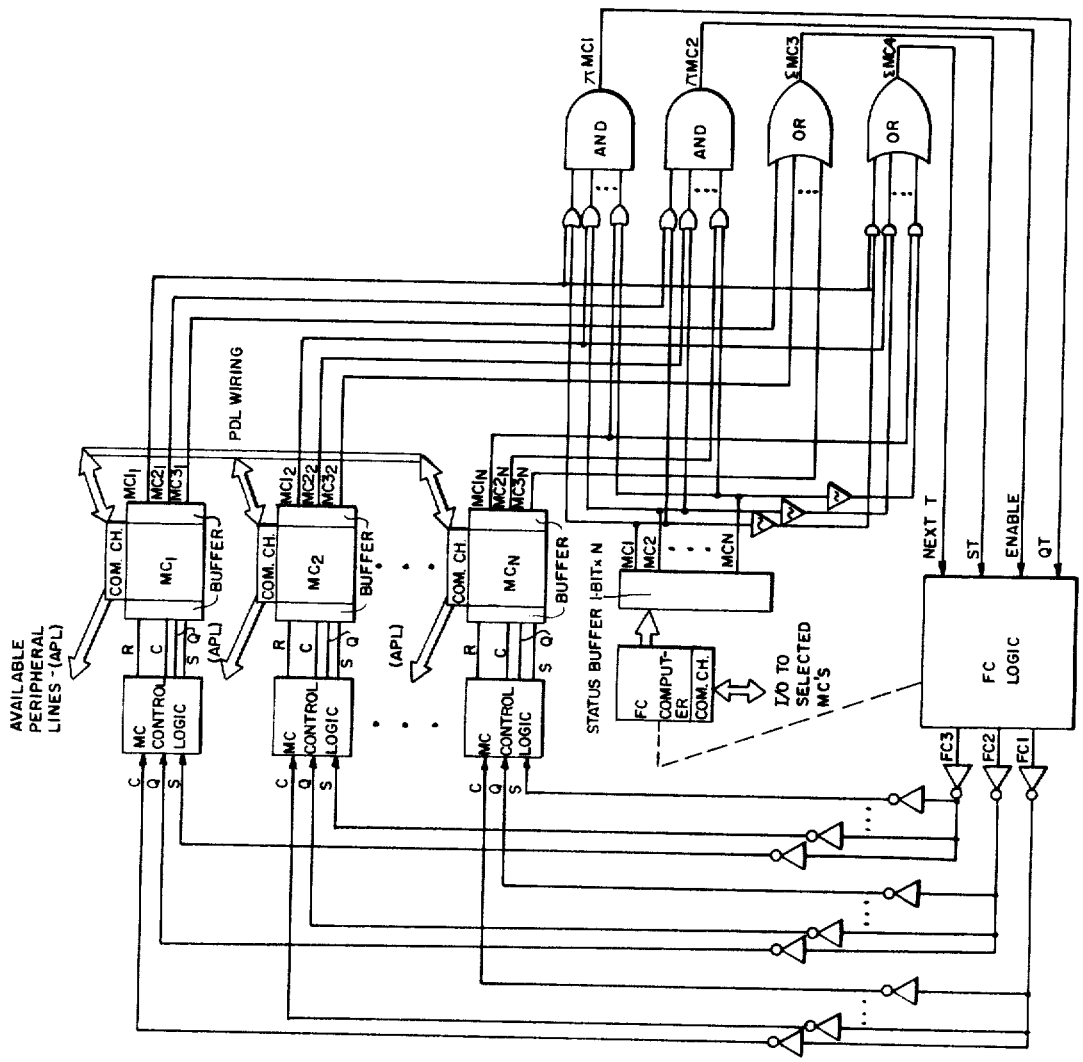

The system detail is shown in FIG. 7a. The notation conventions used in the example circuits are as follows.

$MC_i$ stands the the "i-th" component computer in the array. FC is the Foreman Computer.

Control lines from MC's to the FC Logic are designated $MC1_i$, $MC2_i$, and $MC3_i$. These are voting lines and must be collected by fan-in gates. Four lines are generated by fan-in: $\pi MC1$, $\pi MC2$, $\Sigma MC3$, and $\Sigma MC4$.

Control lines fan-out from the FC logic to the MC's. These are FC1, FC2, and FC3. After fan-out, these signals arrive at the MC's as signals into the MC, adding one line, the data-ready line, R.

The FC can override the fan-in control lines from $MC_i$ by setting the single bit in the status buffer and turning on line MCi (not $MC_i$). For example, if $MC_3$ is down, lines $MC1_3$, $MC2_3$, and $MC3_3$ are overridden by setting FC status line MC3.

Each of N MC's supplies three request lines, MC1, MC2, and MC3 to the fan-in logic. MC1 requests a Q transfer, MC3 requests an S transfer, and MC2 is an enable line to tell the FC logic to inspect the requests. The status buffer, maintained by the FC, also fans in and is used to delete MC's from participation in the control logic.

The fan-in produces four control lines. $\pi MC1$ is a unanimous request for a Q transfer. $\Sigma MC3$ high is at least one request for an S transfer. $\Sigma MC4$ decides there is at least one transfer request outstanding. $\pi MC2$ tells the FC logic to inspect the other three lines. If no transfer lines are requesting anything when an inspect request is made, the combinational logic informs the FC of the unanimous desire of the array to go to the compute phase.

The FC logic produces commands in the form of single pulses on lines FC1, FC2, and FC3. FC2 and FC3 instruct the POT-array to do another step in the Q or S transfer, respectively. FC1 directs the array to enter a compute phase. The illustrated amplifiers shape and strengthen the pulses.

The MC control logic, identical and resident in each MC board, decodes the FC commands, presents them to an INTEL 8080 peripheral buffer, and issues an interrupt to the 8080. The 8080 handles the command and request lines and all intercommunications and array-peripherals lines as peripherals in the 8080 system.

FIG. 8a shows the FC Logic in detail. FIG. 8b shows the map realized in FIG. 8a. Standard combinational logic techniques are used. An enable ($\pi MC2$) will go high only when the last MC has signalled an enable. This will occur $\Delta t$ after that MC has sent its request. The delay is generated in software by each MC. The one-shot of FIG. 8a (shown in detail in FIG. 8c) receives the enable and strobes a command onto the FC lines as shown by the timing diagram of FIG. 8d.

Figure 9A:
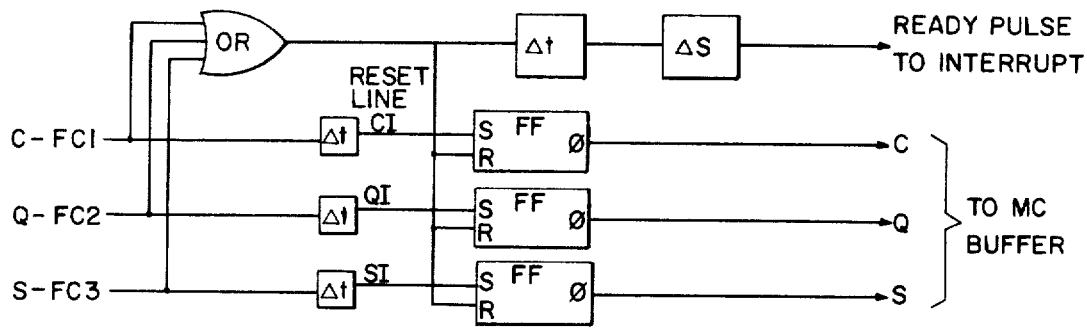
Figure 9B:
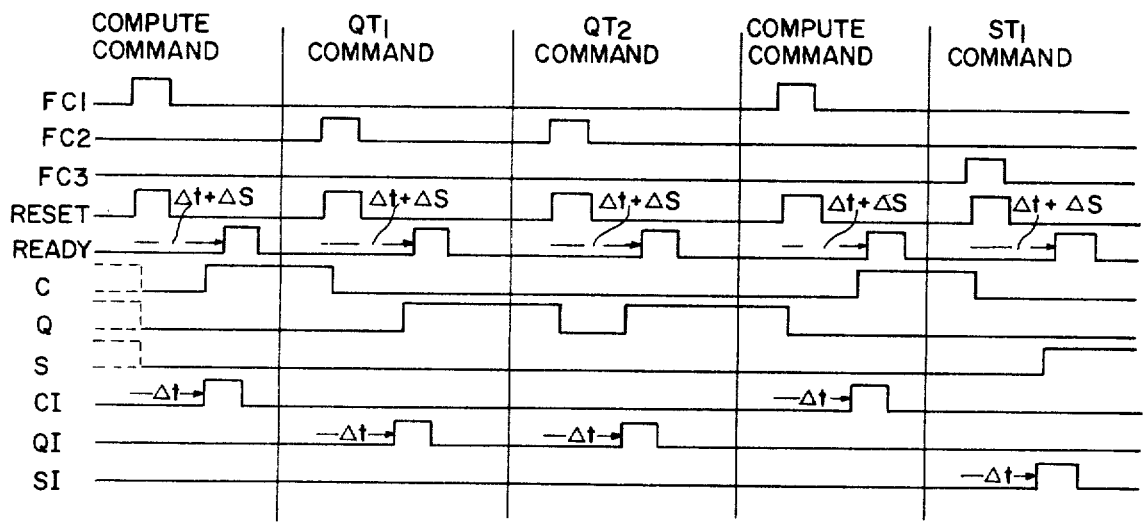

FIG. 9a shows the MC control logic circuit. Whenever a pulse appears at FC1, FC2, or FC3, the Reset line resets the three set-reset flip-flops (FF). A delay of $\Delta t$ later the command pulse arrives at the respective flip-flop which then sets a high level on the appropriate output line. A delay of $\Delta s$ later the Ready Pulse appears as an interrupt to the 8080 system, which responds by reading the CQS word and taking action. FIG. 9b shows examples of timing in the FIG. 9a circuit.

Figure 10:
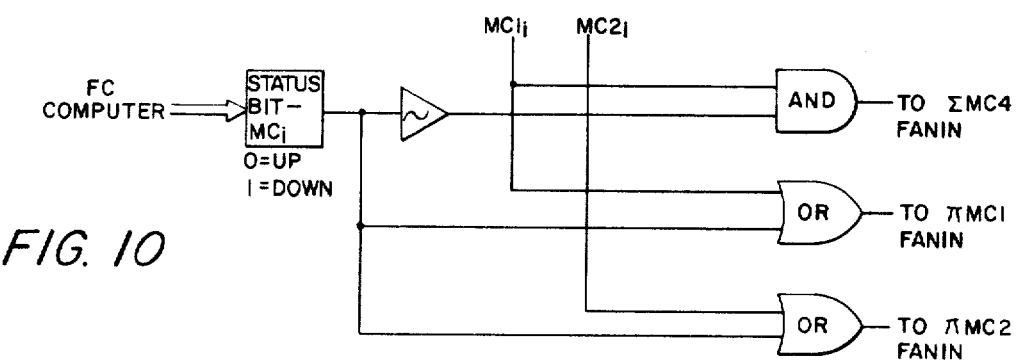

FIG. 10, illustrating failure logic detail, shows how the FC can affect one status bit, the one for $MC_i$, to override or enable the phase-change request lines which originate from $MC_i$. This bit is used to substitute FC default phase-change information for spurious information which may arrive from $MC_i$ if that machine has been reported in error, or to put back "on-line" the same machine, allowing its phase-change information to be used if $MC_i$ is considered operational. In FIG. 7a, the aggregate of all such status bits is represented by the "Status Buffer, 1-bit X N", and the general tie-in of this structure to the system is shown.

Diagnostics are run by the FC computer. If $MC_i$ fails, the FC sets the $MC_i$ status bit to "1". Then that MC is constantly enabled ($MC2_i$) and requesting a Q transfer ($MC1_i$). Since additional transfer steps are requested through MC3 and MC4, these lines are zeroed permanently. The net effect is to remove $MC_i$ from any further influence over the phase changes of the array.

FIG. 11a shows the MC output channel (part of COM. CH. in FIG. 7a) replicated for all outgoing intercommunications lines throughout the array. The four Texas Instruments SN74199's form a parallel-load 32-bit buffer filled at the convenience of the 8080 while S/L is held low. Once filled, the 8080 stores a "1" in the buffer feeding the S/L line, changing the SN 74199 mode to serial. Then similarly, the 8080 enables the clock (line BOE) and 32 bits are passed serially through the 3-level logic device as shown in FIG. 11b, and onto the outgoing data line.

Figure 12A:
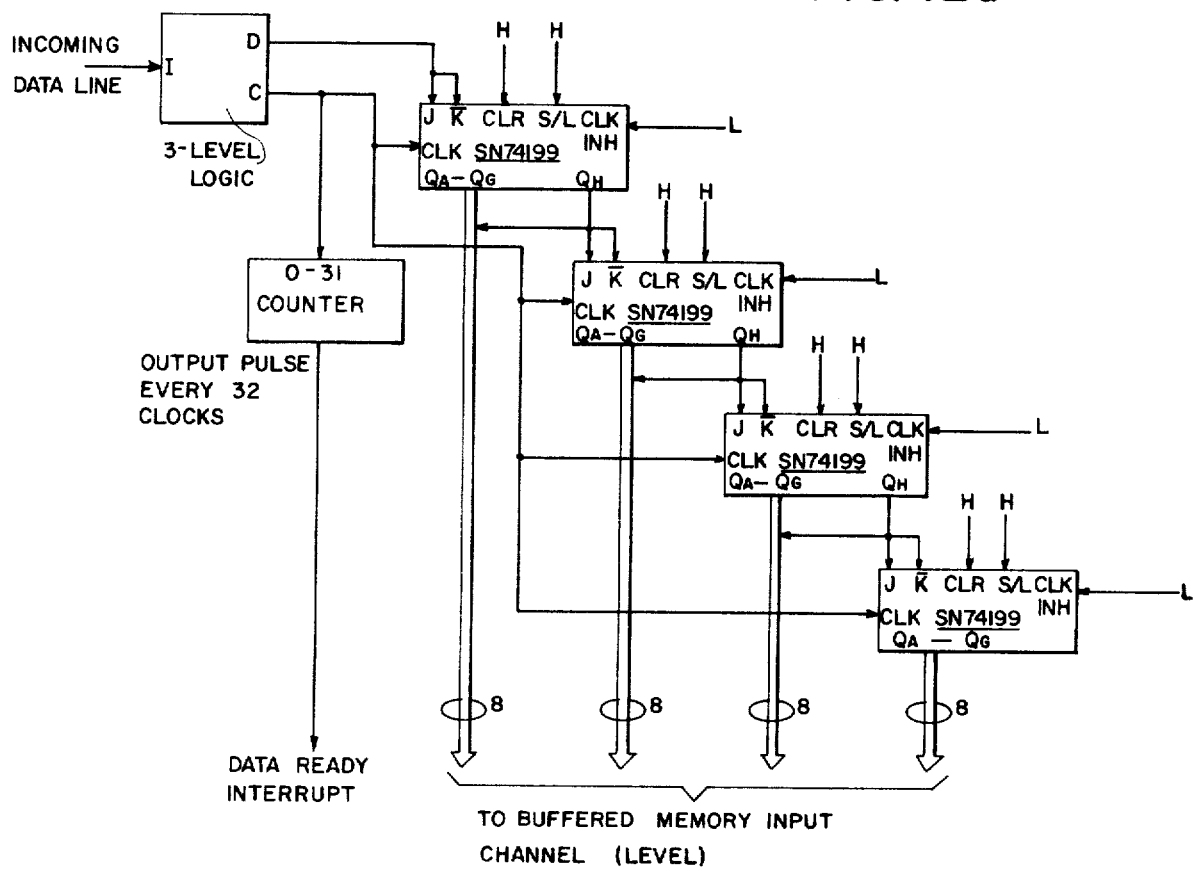
Figure 12B:
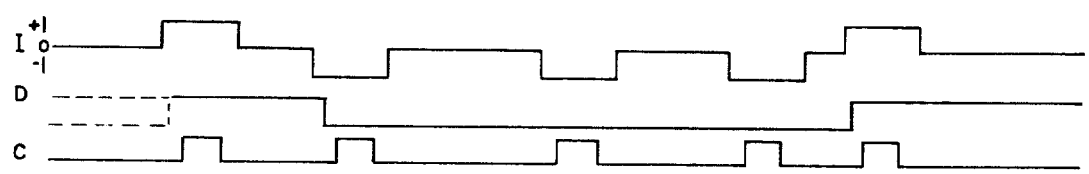

FIG. 12a shows the MC input channel (part of COM. CH. in FIG. 7a). The incoming data line, fed by another MC's outgoing data line, passes the signal through a 3-level device, operating as shown in FIG. 12b, and produces two signals, a data line (D) and a clock line (C). The clock line strobes the data into four SN74199's permanently moded to shift. A 0-to-31 counter monitors the clock lines. When the clock rolls over, the 32-bit data has been received and an interrupt signals that fact to the 8080. The 8080 then buffers in the received 32 bits.

The structure just described is sufficient to allow the POT-array to operate, i.e., to compute during a compute phase and to transfer data during a transfer phase. Various software systems will determine the performance capacities of the array. In general, each MC will have a resident (preferably ROM-resident) operating system (OS) in accordance with standard practices for the 8080 or other MC's employed. Each OS will allow jobs to execute within its MC and will manage phase-change requests from those jobs by appropriate communications with the FC. Each OS will maintain error-detecting means within its MC and with respect to data sent and received for whatever purpose. Each OS will have means, such as a timer, to guarantee phase-change (and thus prevent phase-change lockout). Each OS will manage I/O requests from its current resident job. Each OS will manage transfer activities within its MC, including queueing and sorting; it may contain the Queue and Symmetric transfer algorithms described hereinafter. Each OS will maintain an updatable list of current nearestneighbor MC's for graceful degradation purposes.

To decide on Queue or Symmetric transfer automatically, one must first determine several "tuning" parameters, then design or adjust logic to accommodate them. These parameters are decided by the user or system software according to site conventions. The exact trade-off between Queue and Symmetric transfers is left up to the installation manager. The combinational logic controlling the entire array is designed to act as a slave to the wishes of the component computers. If one or more computers signal a request for a Symmetric transfer, a Symmetric transfer is selected; otherwise, a Queue transfer is selected. The decision regarding the actual transfer type therefore actually resides with each component computer which makes its selection, then "votes" on the actual selection according to the above scheme. The Foreman Computer may vote, through the status buffer (FIG. 7a) in lieu of any computer it considers non-functional. The Foreman Computer's vote takes precedence, and it always votes for a Queue transfer.

The algorithm to select a vote in each component computer is the same throughout and depends principally on the number of different destinations required by the data it needs to transfer. Heuristically, few destinations imply a Queue transfer while many destinations imply a Symmetric transfer. The Symmetric transfer wastes time in the former case and the Queue transfer requires excessive amounts of intermediate storage capacity in the latter.

The amount of data for a particular destination is also a consideration, but much less important than the number of different destinations.

The simplest algorithm which works well to make the decision is to select a "threshold" number of destinations. Any component computer which finds, while inspecting its next set of data to be sent, a number of required destinations equal to or exceeding the threshold will select the Symmetric transfer. If less than the threshold are found, the Queue transfer is selected. The decision occurs, of course, only immediately prior to each transfer phase, and not at each step of the transfer phase. In a 125-computer array, for example, the threshold might be 20.

More complex algorithms which vary the threshold dynamically or which consider the amount of data for a particular destination or even which consider destination patterns might be described, but would only represent incremental improvements over this simple algorithm.

Data to be handled by either the Queue or Symmetric transfer may arrive either from incoming data lines or from the local component computer itself. Data is handled differently depending on whether a Queue or Symmetric transfer has been selected. The hardware utilization required to handle a Queue transfer will be described first.

Figure 13:
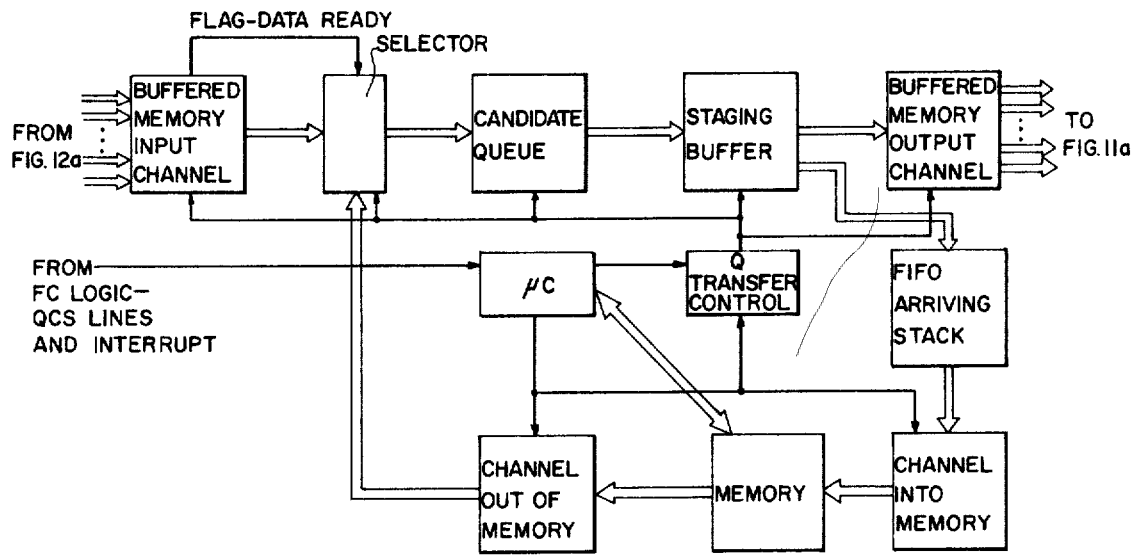

Referring to FIG. 13, incoming data is collected in the "Buffered Memory Input Channel". This hardware is simply a set of registers to hold data until needed. When all the data has been collected the "Data Ready" flag is set.

The "Channel Out of Memory" has a similar function. It is a programmable data channel in the traditional sense which can pick up data from "Memory" under instructions from the "micro-computer" ($\mu$C), and hold it until further need. This is data which must be sent to other microcomputers, organized as data-destination (DD) words.

The "Selector", on orders from the "Queue Transfer Control", routes data from either input source to the "Candidate Queue" which is first in, first out (FIFO). The order of selection for this queue is unimportant. The Candidate Queue holds all data until needed by the "Staging Buffer", again under Queue transfer control. The action of the Queue Transfer Control on the Staging Buffer and the Candidate Queue is now described. This is the heart of the Queue transfer.

An incoming data-destination word contains the absolute number of its destination machine, as well as the data and perhaps other things such as the return address. In the example, 125 machines are interconnected as a three-dimensional torus of sidelength five. Each machine may be uniquely represented by its base-five number, $000_5$–$444_5$. Each digit of this number corresponds to a dimensional direction in the torus.

Figure 15:
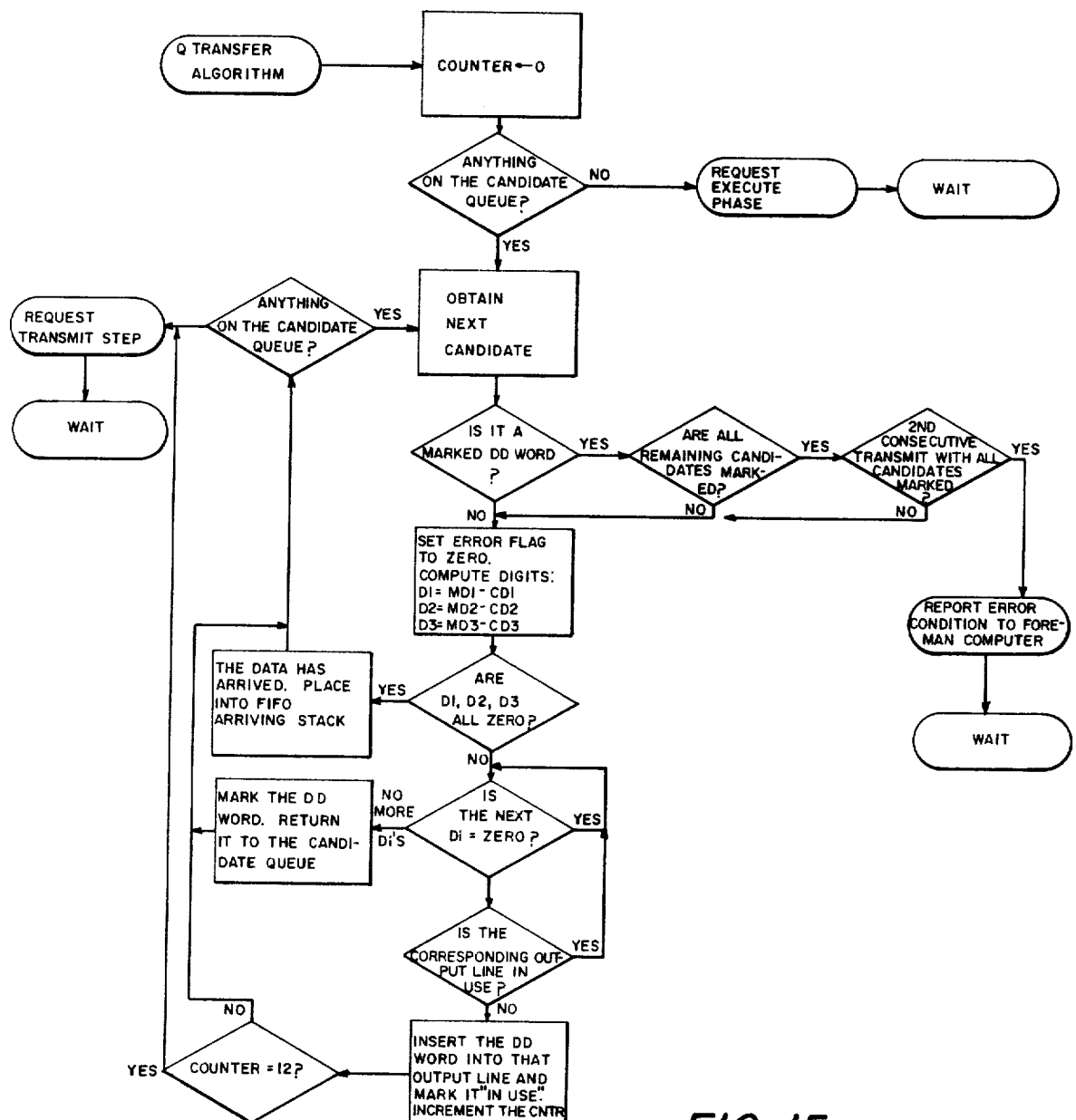
FIGS. 15 and 16 are diagrams illustrating transfer algorithms explanatory of the operation of the structures of FIGS. 13 and 14, respectively.

In the following, refer to the "Q Transfer Algorithm" of FIG. 15. Whether from the present component computer or from an outside source, all DD words are put into a linear FIFO Queue, the "Candidate Queue", to await being assigned to an output line. The next DD word off the Candidate Queue is inspected. The destination is recovered and reconverted, if necessary, into a three-digit base-five number. (The destination could be represented in the form of three groups of three binary bits, or nine bits, where each group is a base-five destination digit. This requires no conversion. The 125 computers could be represented in base two by only seven bits ($2**7=128$), saving two bits, but this form requires conversion. The former is preferred.) This number is subtracted digitwise from the absolute three-digit base-five number of the current machine. The result is three signed digits representing displacement of this machine from the destination machine in the torus structure. These digits are examined in uniform order. If a digit is zero, no further motion is needed in that digit's direction. Otherwise, the signed digit maps uniquely and unambiguously to an output line in that digit's direction in the output Staging Buffer. This line buffer is inspected to see if it is yet available on this transmit step. If it is available, the DD word is assigned to it, and the next DD word is pulled from the Candidate Queue. If not, the next result digit and hence dimensional direction is considered in a like manner. Each time a DD word is assigned, a counter is incremented. If the counter reaches 12, no more output lines are available and the process terminates with the computer signalling the combinational control logic that it is ready to transmit.

If no output line buffer in the Staging Buffer can be found for the DD word, it is returned to the bottom of the Candidate Queue and the next Candidate is tried. The returned DD word is marked that it has tried and failed. If, at the time of its selection, it is the only Candidate on the Queue or all other Candidates have also tried and failed, and this happens on two successive transmits, then an error condition exists and is reported to the Foreman Computer.

If the Candidate Queue is empty before the counter reaches 12, the process terminates with a request for transmit.

If no Candidate are on the Candidate Queue at the start of a transmit step, then the computer signals the combinational logic for an EXECUTE step next.

If all three base-five digits which result from the subtraction are zero, then the DD word has arrived, and is placed into the "FIFO Arriving Stack" to be routed to memory.

The FIFO Arriving Stack is simply a pushdown stack in hardware implemented, for example, out of shift registers in well-known ways.

The "Channel Into Memory" is capable of accepting data from the FIFO Arriving Stack and placing it into Memory at locations programmed by the microcomputer (μC) in the well-known manner of channels.

The microcomputer is the component computer local to this array node. The Queue Transfer Control algorithm described above may simply be a fixed set of instructions for the microcomputer invoked by appropriate commands and interrupts from the FC logic, or may be a separate hardware device, such as another computer, to execute the same algorithm. The result is the same.

Figure 14:
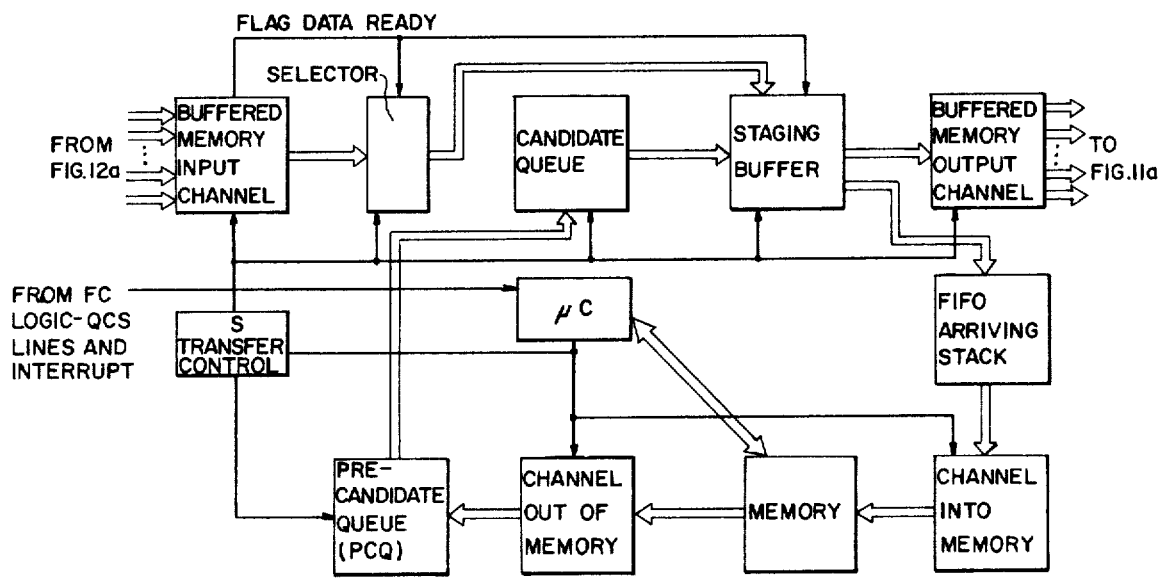
Figure 16:
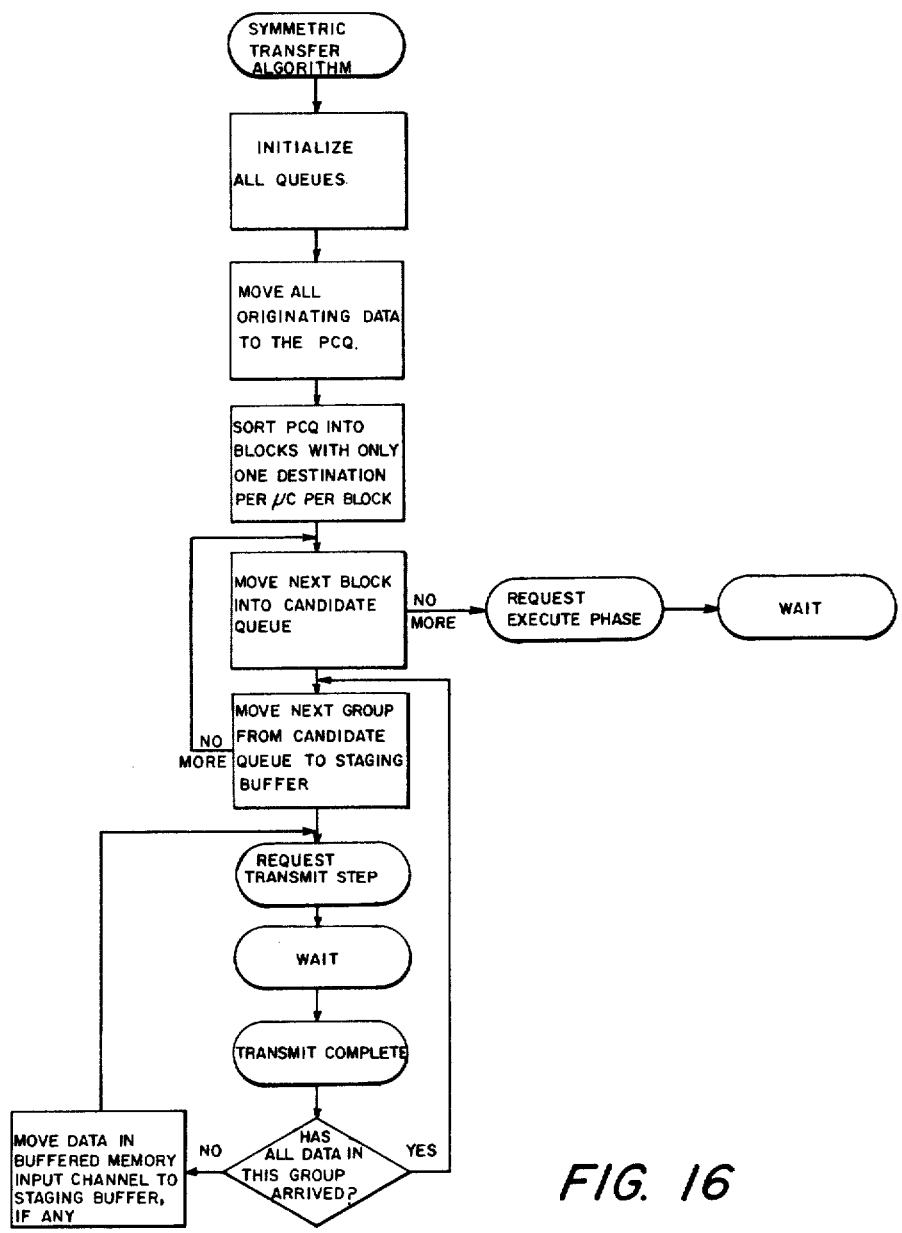

The basic difference between the Queue transfer and the Symmetric transfers lie in the way originating data is put into the Candidate Queue, and the way "in-transit" data always gets first shot at the Staging Buffer. Otherwise the hardware (shown in FIG. 14) is identical to the Queue transfer hardware. The Symmetric transfer algorithm is shown in FIG. 16.

Originating data is first put on a FIFO Queue which will be called the Pre-Candidate Queue (PCQ). All data to be sent is put on this Queue. Each possible destination machine is assigned one DD word slot in the Candidate Queue in a fixed order which is the order of transmission for the Symmetric transfer. When all the DD words from the PCQ which can find empty slots in the Candidate Queue have been moved, the first group of DD words from the Candidate Queues are moved to the Staging Buffer. The sort, described below, guarantees that each member of this and every following group will find an output line buffer.

This data is transmitted to the next stops. Data coming into the Buffered Memory Input Channel is given first priority to the Staging Buffer by means of signals to the Selector. All data which is en route must be delivered before any new data can be staged for transmission.

The PCQ is a RAM on which both the microcomputer and the Channel Out of Memory may operate. An order of transmission is sent by the FC to each microcomputer when the system is initialized. This order takes into account any broken microcomputers and prevents data from being staged for microcomputers which are not available by simply failing to include the necessary slots. If a neighboring microcomputer is down, the appropriate buffer in the Staging Buffer is marked "busy". In this way, both the Queue and Symmetric transfers are able to route data around broken machines. The PCQ is used to sort data into proper order for transmission. Only one DD word can be sent to each possible destination on one pass through the Symmetric transfer. If more DD words need to be sent to a particular destination, multiple Symmetric transfer passes will be made.

It should be noted that many times slots in the Candidate Queue may go unfilled. Failure logic can make use of these vacancies to find efficient alternate routes for data around failed machines.

Figures 17, 18, 19, 20:
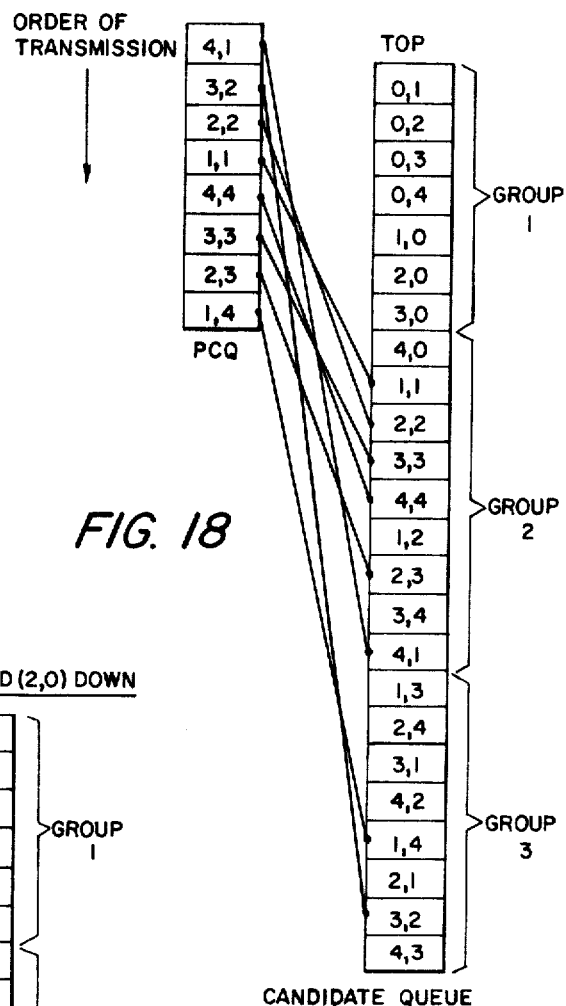
FIG. 17 is a diagram of a two-dimensional array, the diagram being employed in explaining the transfer of data in the array.
FIGS. 18, 19, and 20 are diagrams illustrative of the transfer of data under different circumstances.

FIG. 17 illustrates a 5×5 array, with each machine designated by two numbers representing the X and Y coordinates in the array relative to an originating machine (0, 0). FIG. 18 illustrates the order of transmission in the array of FIG. 17 relative to machine (0, 0) when all machines are available. The data in the PCQ would be sorted into the slots shown in the Candidate Q for the Symmetric transfer. The remaining slots would be vacant.

FIGS. 19 and 20 illustrate two different cases of alternate orders of execution to bypass broken machines. Similar lists would be prepared for each machine. Notice the need for a separate group and a three-step routing in Group 6 of FIG. 20. Data destined for (2, 2) would be sent to (4, 0) from (0, 0) first. Then (4, 0) will handle it as data in transit which it received quite naturally, forwarding it to (4, 2) and then to (2, 2) with no queues or interference. This is due to the power of the PDL wiring scheme.

The philosophy of detecting broken machines in PDL POT-array computers has two main facets: errors in component computers and errors in the intercommunications system.

Errors in component computers are detected in classical manner by running special diagnostics programs within each machine to test the major logical pathways. These diagnostics are run continuously during times when a component computer is not otherwise occupied. At all times checks can be maintained on hardware systems by means of parity tests, for example, or checksums, or the like. Techniques for diagnosing the existence of a failure in a computer are well known, and no expansion is contemplated here.

If a failure is detected in a component computer during a diagnostic background program or by parity checks, checksums, etc., anytime, this fact is reported to the FC by running a high-priority program in this component computer which sends error DD words to the FC through all outgoing lines exiting this component computer.

Errors in the intercommunications system can be detected by adding error detection or error correction codes to each DD word. A one-bit-correction, two-bit-detection code would be generated by standard logic, added to a DD word as it originates, and checked and corrected if necessary at each intermediate stop, including the final stop. If a correction were necessary, a notation would be made in a local statistics file in the component computer making the detection, to be sent to the FC for analysis at the earliest opportunity. If a two-bit error were detected, this unrecoverable condition would cause DD words to be sent immediately to the FC for error recovery, using all possible outgoing lines.

The FC, upon receipt of error conditions, will take necessary actions to reconfigure the array and restart production processing.

Although the methods for detecting errors are standard, the use of the "grass-fire" transmission of error messages to the FC by having each machine pass any detected error message immediately in all directions until some message reaches the FC is a capability of the invention.

A concept implicitly used in the preceding discussion will now be amplified further. The map maintained by the OS describes what jobs are assigned to which "up" machines. It also tells which "up" machines are available for assignment. When a job presents itself to the OS for scheduling, it must tell the OS how many machines and which kinds of peripherals it requires. The OS then assigns available machines and peripherals to the job and loads it, or defers it until such resources are available.

This technique means that any job may use any available set of component machines and peripherals, regardless of what else is going on in the POT-array. Messages from a job can be handled by machines assigned to other jobs, since a machine during the transfer phase can only tell whether a message has arrived or needs to be sent along. Messages are messages, and are sorted by each message knowing its destination. This principle, which is available due to the POT-array structure, but which is enhanced by the novel wiring arrangements and optimum array side lengths of the invention, enables maximum utilization of hardware. A logically contiguous set of machines, that is, a set of machines assigned to one job, need not and in general will not be a physically contiguous set of machines.

This is an enormous advantage over other array processors such as the ILLIAC in which logically contiguous programs are considered to require physically contiguous processors. The advantage comes from the treatment of component computers as stand-alone machines which can communicate rapidly and effectively with any other machine in the array. Thus machine assignments can be managed as Virtual Machine Mapping in a manner analogous to the multi-processing management of memory space in existing computers. The ability to treat whole computers (component computers) in this manner is a significant advantage.

It may be of interest to note here that the mistaken philosophical concepts of prior art arrays and wiring schemes (in which it was deemed unnecessary to go beyond nearest neighbor machine communication and in which correspondence between physical array and logical program structure was fundamental) are perhaps responsible for the failure of the prior art to discover the principles and capabilities of the inter-communication systems of the invention (despite the fact that after the discovery of PDL wiring, it is possible to degenerate the broader PDL scheme and arrive at nearest neighbor wiring).

The simplicity of the POT-arrays of the invention can be reflected in the hardware itself. If each board in the machine is a stand-alone computer, for example of the newly emerging microcomputer class, it is possible to come very close to the ideal that all boards in the mainframe are identical. Only hardware needed to feed the control logic, and the control logic itself, may force a deviation from this pattern.

All machines in the array require connections to a power supply, the control logic, hardwired other machines, and peripherals, if any. The power supply, control logic, and peripherals can be assigned to the same pins on each board. Due to the hypertoroidal nature of the POT-array intercommunications wiring, the same pin on each board can be assigned to the same relative other board throughout the array (recall K-th relatives). In other words, only one pin assignment need be made on any machine board. Further, all sockets in the mainframe contain symmetric wiring with respect to the rest of the frame. (For example, pin number two on any board might go to pin 15 on the board two over and one down, for any board in the array.) The advantage of this feature in terms of manufacturing ease is both great and obvious. In particular, any board can be inserted into any socket in the mainframe. A wiring diagram for sockets can be reduced to that of one socket alone.

It should be noted that these boards can be designed so that no electrical problems are introduced into the array when a board is inserted or removed with the machine operating. Thus boards can be replaced without catastrophically harming the operation of the computing system as a whole.

If a good machine is inadvertently disturbed, while servicing the array, to a degree which causes a failure, the system merely invokes standard failure recovery methods to handle the error. No permanent harm is done.

This same symmetry makes it easy to sub-divide or enlarge the system. To make the system smaller simply inform the OS that a certain block of machines (for example, one cabinet) is no longer available, then physically disconnect them. (In fact, one could in principle simply disconnect the cabinet and let the error recovery system reconfigure.) To enlarge the system, attach another cabinet as another dimensional direction and inform the OS that the hardware exists. Of course, provisions for the additional wiring must have been included in the original cabinets and board design.

A system could be easily specified using the above principles which would provide the long-sought capability for selling computing power "by the pound". The system is designed initially for a certain maximum size, then any subset of that maximum can be implemented initially and expanded in arbitrary increments up to the maximum. The advantages commercially of one system which can be expanded or contracted to fit all customers in a very painless manner are apparent.

The power of the basic POT-array design lies in its parallelism both in executions and intercommunications. It does not depend as strongly on the power of the component computers, although these should be as fast and powerful as possible with the largest practical memory space in each. Current micro-computers or computers-on-a-chip manufacturers are beginning to develop machines with capabilities suitable for use in a POT-array system. It is those components for which the design was evolved. Since POT-arrays of ten thousand or more machines are perfectly realized under current technology and stand-alone microcomputers in the one-hundred dollar range are fast becoming reality, a large machine could be build, utilizing the efficient wiring schemes of the invention, whose cost is in line with today's current supercomputers. A ten-thousand machine POT-array would potentially have about a ten-thousand-to-one advantage over a single component microcomputer. Assuming one instruction per microsecond for these microcomputers, the effective instruction rate of the full POT-array could reach 100 picoseconds per instruction, a hundred times or more faster than existing supercomputers, at a comparable cost. An array of even 100 machines would execute one instruction every 10 nano-seconds, effectively, which is comparable to or faster than existing supercomputers.

The applications of the invention to multi-processing and graceful degradation have been mentioned. The invention may also be the most cost-effective device currently known on which to run a time-sharing system. Suppose the above arrray of 100 machines were used as a time-sharing "front-end" computer. Even assuming each component computer could service only five users as peripherals (50 is more likely for a one-microsecond machine), the array could handle 500 on-line users roughly.

Another application of the POT-array is a mass-storage system. Here again the array is greatly enhanced by the invention. Peripherals might be other computers which use the POT-array as secondary storage. As a read-only system, the peripheral computer would send a read request into the array. The request would propagate to the location of the data, a return message would be assembled and transmitted back to the point of origin. Many machines could simultaneously have read-only access to the same data base, with conflicts and priorities being resolved automatically.

To write into the system, storage space should probably be assigned distinctly to each peripheral computer which wants to write. The data would propagate in and be stored, then be available to all peripheral machines in read-only mode.

File protection could be implemented by telling each component computer which peripheral computers have access to its files. This system would be simple and effective.

The cost of such a memory system would be little more than the cost-per-bit of the solid-state memory associated with the component computers. The use of large LSI shift registers ("silicon disks") is becoming practical and would bring this cost down greatly.

Still another memory mode is available. The computing power of the array means data can be pre-fetched and ordered to feed a high-speed "pipeline" CP. The random-fetch phase proceeds in parallel, and such data arrives at a collection point to be available at extremely high serial rates.

The POT-arrays of the invention are applicable to business programming. The array can execute file search, sort, and update as well as large data-base management using parallel algorithms which, although known to some extent, could not be implemented on serial machines. Extremely powerful, efficient business computers can be consolidated.

The scientific applications are also numerous. The POT-arrays of the invention can show a significant advantage over conventional computers or any problem which can be executed in parallel. This includes weather models, CTR (controlled thermonuclear research) work, air traffic control, and many others.

One particular scientific application is worth noting in some detail. The high degree of interconnective bandwidth and flexibility of the system of the invention make it well-suited to the simulation of neural networks, an activity which could lead to major breakthroughs in pattern recognition and artificial intelligence. In fact, for interesting neural systems, i.e., ones which can do useful work, the POT-array architecture is the only known machine which can execute the code in the required time-frame.

By implication, the POT-arrays of the invention have important real-time processing advantages.

In summary, then, the POT-array architecture of the invention is a new species of computer, rather than simply a "next-generation" machine. It has significant advantages in almost all important aspects of computers, advantages which derive from its symmetry, simplicity, and the discovery of the power of its novel wiring, as well as properties of the hypertoroidal configuration.

While preferred embodiments of the invention have been shown and described, it will be apparent to those skilled in the art that changes may be made without departing from the principles and spirit of the invention, the scope of which is defined by the following claims.

I claim:

1. A set of at least five data handling machines in which each machine has means for communicating with respect to the other machines of the set, said set having means including a system of one-way inter-machine communication channels interconnecting the machines in the set so that any machine in the set may communicate with any other machine in the set, each inter-machine communication channel extending between a single pair of machines of the set and permitting a data transmitting machine at one end of the channel to communicate data directly to a data receiving machine at the opposite end of that channel, a root machine of the set being connected only to each of a first subset of machines of the set for direct communication therewith by corresponding outgoing inter-machine communication channels of the system, each machine of the first subset being connected only to machines of a second subset of machines of the set for direct communication therewith by corresponding outgoing inter-machine communication channels of the system, with the number of outgoing inter-machine communication channels from each machine of the first subset being equal to the number of outgoing inter-machine communication channels from the root machine, the machines of the second subset also being connected to machines of the set by outgoing inter-machine communication channels of the system, each of said subsets including at least two machines, the maximum number of inter-machine communication channels required for any machine in the set to communicate with any other machine of the set being equal to the maximum number of inter-machine communication channels required for communication between the root machine and a machine of the set that is most distant therefrom, the number of outgoing inter-machine communication channels from each machine being substantially smaller than the total number of machines in the set, each machine of the set having connected thereto as inputs outgoing inter-machine communication channels from other machines of the set so that each machine of the set may communicate with certain machines of the set directly and with the remaining machines of the set only via intermediate machines.

2. A set of data handling machines in accordance with claim 1, wherein said machines comprise computers.

3. A set of data handling machines in accordance with claim 1, wherein said machines comprise stand-alone computers.

4. A set of data handling machines in accordance with claim 1, wherein said machines comprise memory devices.

5. A set of data handling machines in accordance with claim 1, wherein the number of outgoing inter-machine communication channels from each machine is two.

6. A set of data handling machines in accordance with claim 1, wherein the number of outgoing inter-machine communication channels from each machine is three.

7. A set of data handling machines in accordance with claim 1, wherein the number of machines in the second subset is equal to the total number of outgoing communication channels from the machines of the first subset.

8. A set of data handling machines in accordance with claim 1, wherein the machines are arranged in successive subsets including said first and second subsets and wherein a final subset includes fewer machines than the number of outgoing inter-machine communication channels thereto from the preceding subset.

9. A set of data handling machines in accordance with claim 1, wherein the machines are arranged in successive subsets including said first and second subsets and wherein certain machines of the final subset have additional outgoing inter-machine communication channels.

10. A set of data handling machines in accordance with calim 1, wherein the number of outgoing inter-machine communication channels from each machine is the same as that for every other machine in the set and wherein any machine in the set may serve as the root machine.

11. A multi-dimensional system of data handling machines, said system comprising at least one two-dimensional array of said machines, each machine of the array having means for communicating with respect to the other machines of the array, the array including at least sixteen machines arranged in at least four sub-arrays, each sub-array having at least four machines, each machine of each sub-array being connected by a separate inter-machine communication channel to each of the other machines of that sub-array and by a separate inter-machine communication channel to a corresponding machine of each of the other sub-arrays, said channels and said communicating means constituting a communication network in which a data transmitting machine at one end of any inter-machine communication channel may communicate data to a data receiving machine at the opposite end of that channel, the total number of inter-machine communication channels in the array being approximately equal to the sum of all of the previously recited intermachine communication channels, whereby each machine of the array may communicate with certain machines of the array directly and with the remaining machines of the array only via intermediate machines.

12. A system in accordance with claim 11, wherein the system is hypertoroidal.

13. A system in accordance with claim 11, wherein the system includes a plurality of said two-dimensional arrays.

14. A system in accordance with claim 13, wherein each array has at least four machines in each dimensional direction.

15. A system in accordance with claim 13, wherein each array has sub-arrays corresponding to sub-arrays of the other arrays and each sub-array has machines corresponding to those of the other sub-arrays for each dimensional direction.

16. A system in accordance with claim 13, wherein there are from four to twenty machines in each dimensional direction of the system.

17. A system in accordance with claim 13, wherein there are five machines in each dimensional direction of the system.

18. A system in accordance with claim 11, wherein said machines comprise computers.

19. A system in accordance with claim 11, wherein said machines comprise stand-alone computers.

20. A system in accordance with claim 11, wherein said machines comprise memory devices.

21. A system in accordance with claim 11, further comprising means for transferring data by successive machine-to-machine transfer steps along said inter-machine communication channels from each machine of the array to a destination machine of the array.

22. A system in accordance with claim 21, wherein the transfer means comprises means for determining the distances remaining to the destination machine at each transfer step, and means for transferring the data to the destination machine by at most one move in each dimensional direction of the system at each step.

23. A system in accordance with claim 21, wherein said transfer means comprises means for transferring said data from each machine in the order in which the data originated in a source associated with that machine or was received by that machine.

24. A system in accordance with claim 21, wherein said transfer means comprises means for transferring data at each step from each machine to the machine at the next position relative to the transmitting machine.

25. A system in accordance with claim 11, wherein the system includes a plurality of said two-dimensional arrays arranged as a three-dimensional array, with each machine of each two-dimensional array connected to a corresponding machine of every other two-dimensional array by a separate inter-machine communication channel.

26. A system in accordance with claim 25, wherein a plurality of said three-dimensional arrays are arranged as a four-dimensional array, with each machine of each three-dimensional array being connected to a corresponding machine of every other three-dimensional array by a separate inter-machine communication channel.

27. A system in accordance with claim 26, wherein a plurality of said four-dimensional arrays are arranged as a five-dimensional array, with each machine of each four-dimensional array connected to a corresponding machine of every other four-dimensional array by a separate inter-machine communication channel.

28. A system in accordance with claim 27, wherein the system dimensions and connections are further replicated in the same manner to form a system of any desired dimensions.

29. A system in accordance with claim 11, wherein said inter-machine communication channels are one-way channels.

* * * * *